No. 663,320. Patented Dec. 4, 1900.
J. WRIGHT & J. W. MITCHELL.
APPARATUS FOR BRANDING OR TATTOOING.
(Application filed July 7, 1900.)
(No Model.)
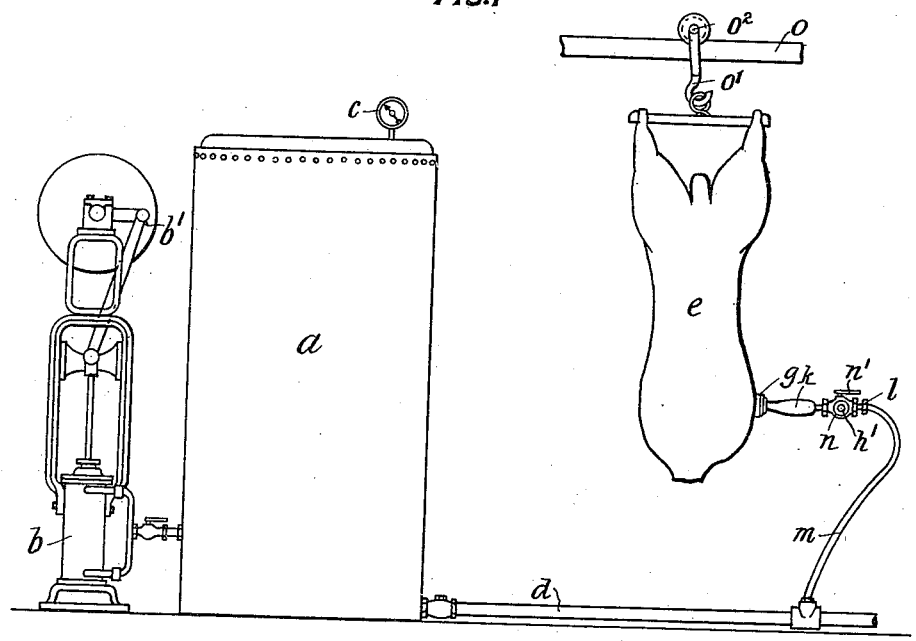
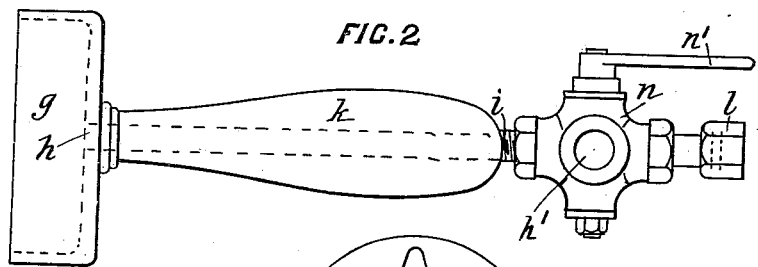
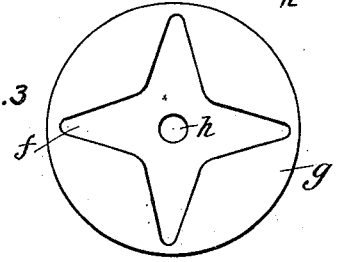
WITNESSES:
Ella L. Giles
Clara D. Frohbach
INVENTORS.
John Wright
John William Mitchell
BY Richardson
ATTORNEYS.

UNITED STATES PATENT OFFICE.

JOHN WRIGHT AND JOHN WILLIAM MITCHELL, OF DUNEDIN, NEW ZEALAND.

APPARATUS FOR BRANDING OR TATTOOING.

SPECIFICATION forming part of Letters Patent No. 663,320, dated December 4, 1900.

Application filed July 7, 1900. Serial No. 22,872. (No model.)

*To all whom it may concern:*

Be it known that we, JOHN WRIGHT and JOHN WILLIAM MITCHELL, subjects of the Queen of Great Britain, residing at 2 Commercial Chambers, Manse street, Dunedin, New Zealand, have invented a new and useful Improved Apparatus for Branding or Tattooing; and we do hereby declare the following to be a full, clear, and exact description of the same.

According to this invention a raised or embossed brand-mark is produced upon the carcasses of animals and upon leather, paper, and the like by means of a vacuum, a drum being employed in which is formed a recessed chamber of the shape of the desired mark, vacuum being caused in said chamber by an air-pump. The part of the object upon which the brand is used is drawn into the chamber and retained therein until the form of the brand-mark is permanently produced. Similar apparatus is employed upon live animals for tattooing, the vacuum-chamber being applied until blood issues through the skin, when the chamber is removed and the coloring-matter usually employed in tattooing rubbed into the skin. When a large number of objects are to be branded—as, for instance, carcasses in abattoirs—a main tank is employed, in which vacuum is maintained by an air-pump. Pipes are led therefrom to where the carcasses are to be operated upon, and flexible tubes are used to connect the branding apparatus with said pipes.

In the drawings, Figure 1, which is an elevation, illustrates such an arrangement. Fig. 2 is a side and Fig. 3 an end elevation of part of the apparatus drawn to a larger scale.

Referring first to Fig. 1, $a$ is a main tank in which vacuum is maintained by air-pump $b$, driven by power applied through a driving-band to pulley $b'$. $c$ is a vacuum-gage upon the tank. $d$ is a main pipe leading from the tank beneath a rail $o$, from which the carcass $e$ to be branded is suspended by a hook $o'$, depending from a pulley $o^2$.

The device $f$ to be produced (see Fig. 3) is recessed in the metal drum $g$, and a hole $h$ is drilled from the back of the device through the drum, where it communicates with a pipe $i$, passing through a handle $k$, fixed to the drum. An ordinary two-way cock $n$, connected to pipe $i$ and operated by handle $n'$, allows the recessed device $f$ in the drum to be in communication with the vacuum-tank or air to pass through the port $h'$ in the cock into the recess $f$ when the branding has been effected.

The face of drum $g$ may be dipped into stearin or the like before placing it against the carcass in order to insure an air-tight joint.

In branding dead animals the operation is commenced while the carcass is warm, and the drum is not removed until the carcass has sufficiently cooled to insure a permanent brand-mark.

When branding leather and paper, the material is first soaked in water or other softening fluid and then preferably dried or allowed to dry before the branding device is removed.

What we claim as our invention, and desire to secure by Letters Patent, is—

1. A branding apparatus comprising a branding-stamp forming a vacuum-chamber, and means communicating therewith to form a vacuum therein and means for destroying said vacuum.

2. In a branding apparatus, in combination, a branding-stamp forming a vacuum-chamber, a handle carrying the same having a conduit leading through the same, communicating with said chamber, a pipe forming a continuation of the same leading to an apparatus for causing a vacuum and a two-way valve arranged in said pipe adapted to open communication between said apparatus and stamp to form a vacuum in the latter or to close communication between the same and open communication between said stamp and the atmosphere to break said vacuum, substantially as described.

In testimony whereof we have signed this specification in the presence of two subscribing witnesses.

JOHN WRIGHT.
JOHN WILLIAM MITCHELL.

Witnesses:
J. R. SINCLAIR,
J. R. PARK.